United States Patent
Melikian et al.

(10) Patent No.: US 9,990,685 B2
(45) Date of Patent: Jun. 5, 2018

(54) AUTOMATED GUIDANCE SYSTEM AND METHOD FOR A COORDINATED MOVEMENT MACHINE

(71) Applicant: Recognition Robotics, Inc., Elyria, OH (US)

(72) Inventors: Simon Melikian, Westlake, OH (US); Stefano Cristiano, Milan (IT)

(73) Assignee: Recognition Robotics, Inc., Elyria, OH (US)

( * ) Notice: Subject to any disclaimer, the term of this patent is extended or adjusted under 35 U.S.C. 154(b) by 25 days.

(21) Appl. No.: 15/075,361

(22) Filed: Mar. 21, 2016

(65) Prior Publication Data
US 2017/0270631 A1    Sep. 21, 2017

(51) Int. Cl.
| | |
|---|---|
| G06T 1/00 | (2006.01) |
| G06N 99/00 | (2010.01) |
| G06K 9/32 | (2006.01) |
| G06T 7/33 | (2017.01) |
| H04N 5/232 | (2006.01) |
| B25J 9/16 | (2006.01) |

(52) U.S. Cl.
CPC ............ *G06T 1/0014* (2013.01); *B25J 9/1687* (2013.01); *G06N 99/005* (2013.01); *H04N 5/23229* (2013.01); *G05B 2219/37561* (2013.01); *G05B 2219/40053* (2013.01); *G05B 2219/45063* (2013.01); *G06K 9/3241* (2013.01); *G06T 7/344* (2017.01)

(58) Field of Classification Search
CPC ............. G06T 7/75; G06T 2207/30164; G06T 2207/30244; G06T 2200/04; G06T 7/32; G06T 7/33; G06T 7/344; G06T 7/70; G06T 1/0014; G06K 9/00228; G06K 9/3241; G06K 9/32; G06K 9/4604; G06N 99/005; G05B 2219/40053; G05B 2219/45063
See application file for complete search history.

(56) References Cited

U.S. PATENT DOCUMENTS

| | | | |
|---|---|---|---|
| 7,177,459 B1 * | 2/2007 | Watanabe | .............. B25J 9/1697 382/151 |
| 7,200,260 B1 | 4/2007 | Watanabe | |
| 7,313,464 B1 | 12/2007 | Perreault | |
| 7,957,583 B2 | 6/2011 | Boca et al. | |

(Continued)

FOREIGN PATENT DOCUMENTS

JP    2003 211381    7/2003

OTHER PUBLICATIONS

European Search Report filed in EP 17154016 dated Jul. 7, 2017.

*Primary Examiner* — Kenny Cese
(74) *Attorney, Agent, or Firm* — Rankin, Hill & Clark LLP

(57) ABSTRACT

An automated guidance system for a coordinated movement machine includes a camera and a processor. The camera is mounted to a movable component of the coordinated movement machine. The processor is configured to visually recognize individual workpieces among a plurality of similarly shaped workpieces using a program running on the processor. The processor is further configured to determine x, y and z and Rx, Ry and Rz of the movable component with respect to each recognized workpiece among the plurality of recognized workpieces, and to move the movable component of the coordinated movement machine after determining x, y and z and Rx, Ry and Rz of the movable component.

15 Claims, 8 Drawing Sheets

(56) References Cited

U.S. PATENT DOCUMENTS

| | | |
|---|---|---|
| 9,008,442 B2 | 4/2015 | Wu et al. |
| 2006/0013470 A1 | 1/2006 | Nagatsuka et al. |
| 2010/0274391 A1 | 10/2010 | Dai |
| 2013/0238128 A1* | 9/2013 | Suzuki ................... B25J 9/1669 700/258 |
| 2015/0197009 A1 | 7/2015 | Melikian |
| 2015/0251314 A1 | 9/2015 | Mammoto |
| 2016/0071285 A1* | 3/2016 | Shibata .............. G06K 9/00261 382/103 |

* cited by examiner (TOP)

(LEFT)

(FRONT)

(REAR)

(RIGHT)

(BOTTOM)

AUTOMATED GUIDANCE SYSTEM AND METHOD FOR A COORDINATED MOVEMENT MACHINE

BACKGROUND

A well-known method and device for detecting the position and posture of an object set on a plane includes storing a two-dimensional image of the object for detection as a teaching model prior to pattern matching of the teaching model with image data produced by a camera. This method and device for detecting the object is often applied when conveying parts and articles ("workpieces") grasped with a robot where the robot is set at a predetermined position with respect to the workpieces being grasped.

Picking out an individual workpiece from a pile of disordered same-shaped workpieces positioned within a predetermined range, e.g. a field of view of a camera, in any three-dimensionally different position and posture had been found not suited for the robot. Attempts have been made to rely on CAD data as the teaching model; however, there are still limitations with detecting the workpiece when the workpiece is in certain three-dimensional positions with respect to the camera on the robot.

U.S. Pat. No. 7,200,260 B1 describes using a CCD camera to generate teaching models of a workpiece. The operator sets a work coordinate system for a workpiece fixed in place. The camera coordinate system for the camera, which is attached to a robot arm, is then calibrated and set in the robot controller. Next, the first position in space (x, y, z) and posture, or angle, of the camera with respect to the workpiece, and subsequent positions and angles that the camera will take with respect to the workpiece are set. The camera then takes these positions, four different positions are described in U.S. Pat. No. 7,200,260 B1, and captures an image at each position. These four images become four different teaching models, which are shown in FIG. 4 in U.S. Pat. No. 7,200,260 B1, and are shown in FIG. 1 herein.

U.S. Pat. No. 7,200,260 B1 describes using pattern matching to locate a workpiece that is shaped like the teaching model. Pattern matching locates an object, in this instance it would be an image of the workpiece, translated in x, y, Rz (rotation about the Z-axis) and scale, which is a percentage. Pattern matching was, at least at the time of the filing date of U.S. Pat. No. 7,200,260 B1, a two-dimensional (2D) process. In pattern matching at that time, there were no Rx or Ry computations. U.S. Pat. No. 7,200,260 B1 describes producing image data with a three-dimensional (3D) visual sensor permitting measurement of distance data, and differentiates this sensor from a CCD camera, which according to U.S. Pat. No. 7,200,260 B1 is for producing a two-dimensional image. Using the method described in U.S. Pat. No. 7,200,260 B1, when an object is found using pattern matching, the z coordinate is taken from data acquired by the 3D visual sensor, and the Rx and Ry are derived from data associated with the robot position at teach, i.e., the robot position when the appropriate teaching model image was taken. As such, if a resolution of +−3 degrees on a range of 30 degrees in Rx and Ry is desired, then 21 different teaching models are needed, which would greatly slow down the pattern matching. In addition, alignment of the 3D map generated by the 3D visual sensor to the 2D image from the CCD camera is critical to achieve reasonable pick accuracy with the robot arm.

SUMMARY

In view of the foregoing, an automated guidance method is provided. The method includes picking up an initial image of a plurality of similarly shaped workpieces with a camera mounted to a movable component of a coordinated movement machine. The method also includes visually recognizing individual workpieces among the plurality of similarly shaped workpieces using a program running on a processor in communication with the camera and the coordinated movement machine. The program compares the initial image with a teaching model stored in a database. The teaching model is based on teaching model images previously picked up by the camera, and the teaching model images are of an object similar in shape and size to one of the plurality of similarly shaped workpieces. The method also includes determining x, y and z and Rx, Ry and Rz of the movable component with respect to each recognized workpiece among the plurality of recognized workpieces. The method further includes moving the movable component of the coordinated movement machine after determining x, y and z and Rx, Ry and Rz of the movable component.

In view of the foregoing, an automated guidance system for a coordinated movement machine includes a camera and at least one processor. The camera is mounted to a movable component of the coordinated movement machine. The processor is in communication with the camera and the coordinated movement machine. The processor is configured to visually recognize individual workpieces among a plurality of similarly shaped workpieces using a program running on the processor. The program compares the initial image with a teaching model stored in a database. The teaching model is based on teaching model images previously picked up by the camera, and the teaching model images are of an object similar in shape and size to one of the plurality of similarly shaped workpieces. The processor is further configured to determine x, y and z and Rx, Ry and Rz of the movable component with respect to each recognized workpiece among the plurality of recognized workpieces, and to move the movable component of the coordinated movement machine after determining x, y and z and Rx, Ry and Rz of the movable component.

DETAILED DESCRIPTION

An automated recognition and guidance system and method for use with a robot 10 will be described in detail. The automated recognition and guidance system and method, however, can be used with any type of coordinated movement machine. Moreover, the automated recognition and guidance system and method is useful to recognize workpieces for being grasped by the robot 10, but the automated recognition and guidance system and method can also be useful for other automated operations such as painting the workpiece, applying adhesive to the workpiece, welding the workpiece, etc. using the robot 10 or another coordinated movement machine.

Figure 1A:
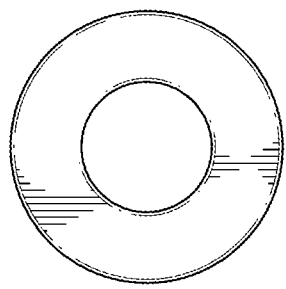
FIGS. 1A-1D depict images of teaching models using a known method for generating teaching models.
Figure 1B:
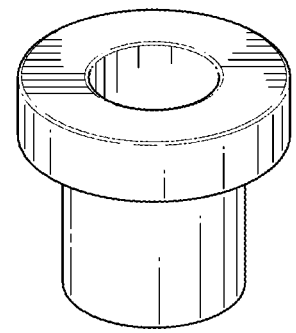
Figure 1C:
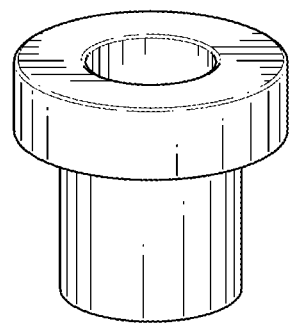
Figure 1D:
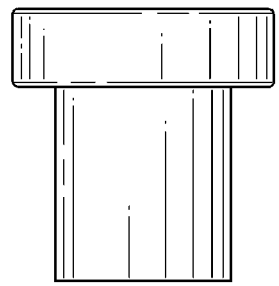
Figure 2:
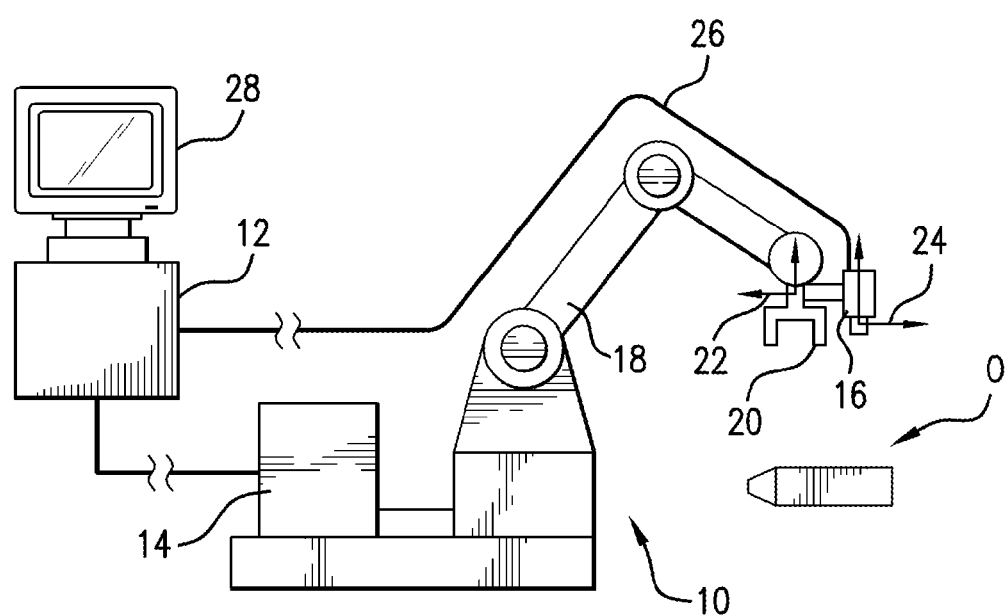
FIG. 2 is a schematic depiction of a robot having a robot arm and an image processing unit in communication with the robot.

FIG. 2 depicts a robot 10 in communication with an image processing unit 12. The robot 10 includes a robot controller 14, which can be conventional, and an image pickup device, which can be a conventional CCD camera 16. The robot 10 includes a robot arm 18 that is moveable in multiple directions and in multiple axes. The camera 16 and an end effector, which is gripper 20 in the illustrated embodiment, is mounted to a distal end portion of the robot arm 18. Other types of end effectors, such as a brush, a cutting tool, a drill, a magnet, a sander, a driver, a spray gun, a vacuum cup, a welding gun, etc., could be mounted to the robot arm 18 instead of the gripper.

A relative relationship between a robot coordinate system 22, which is located at the distal end portion of the robot arm 18, and a camera coordinate system 24 for the camera 16 is set in a conventional manner, e.g., based on the offset between the distal end of the robot arm 18 or a location on the gripper 20 and the camera 16. An image picked up by the camera 16 is output to the image processing unit 12 via a communication line 26, which can be wireless. The image processing unit 12 also includes a monitor 28 for display of the picked up image.

Figure 3:
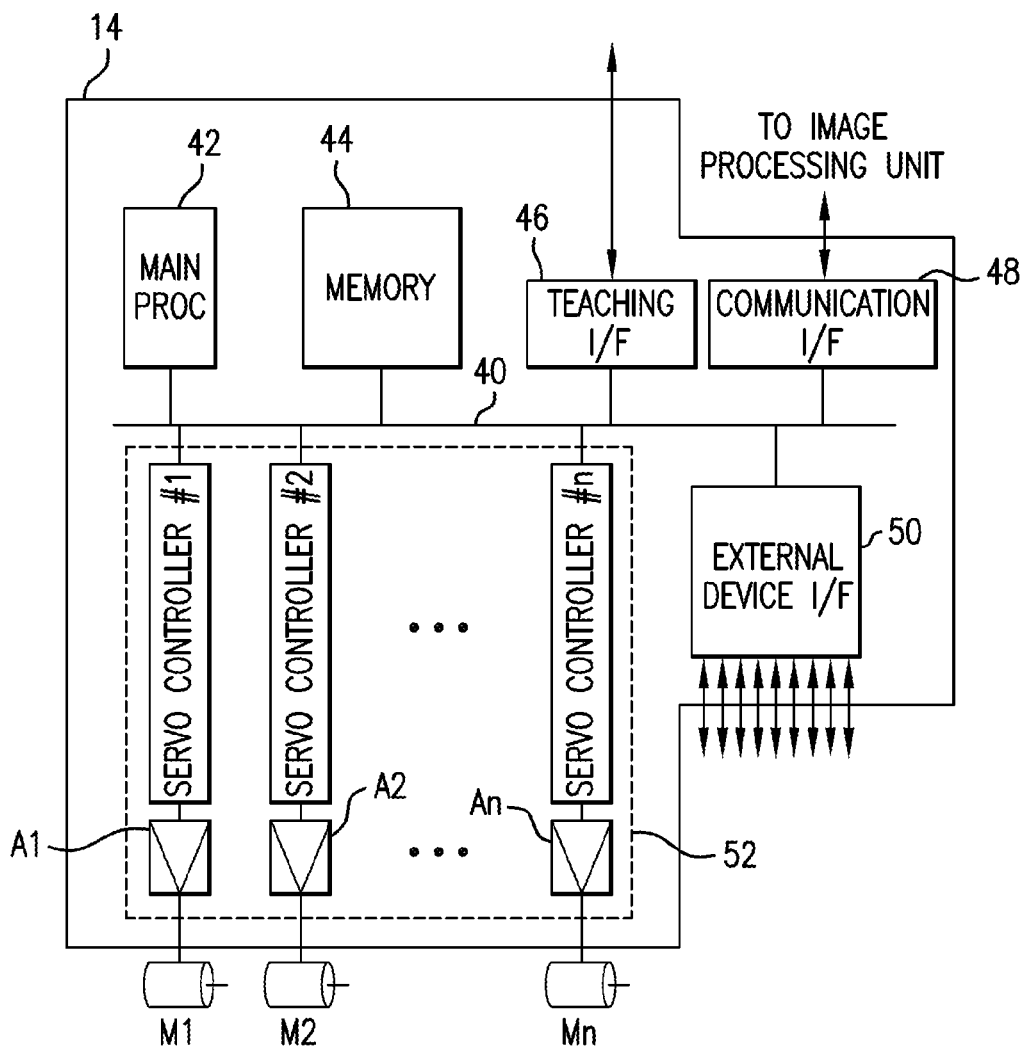
FIG. 3 is a schematic depiction of the components of a robot controller for the robot depicted in FIG. 2.

FIG. 3 schematically depicts the robot controller 14, which can be the same in construction as a conventional robot controller. A bus 40 connects a main processor 42, a memory 44 including RAM, ROM and non-volatile memory, a teaching interface 46, an image processing unit interface 48, an external device interface 50, and a servo control unit 52. A system program for performing basic functions of the robot 10 and robot controller 14 is stored in the ROM of the memory 44. A program for robot operation that varies depending on application is taught beforehand and is stored in the non-volatile memory of the memory 44, together with relevant pre-set data. The program for robot operation that varies depending on application can be taught through the teaching interface 46. The servo control unit 52 includes servo controllers #1 to #n (where n indicates the total number of robot axes). Each of the servo controllers includes a processor and memory arranged to carry out control for a corresponding axis servo motor M1-Mn. Outputs of the servo controllers are delivered through servo amplifiers A1-An to the axis servo motors M1-Mn, which are provided with position/speed detectors for individually detecting the position, speed of the servo motors so that the position/speed of the servo motors is fed back to the servo controllers. External devices such as actuators and sensors of peripheral equipment connect to the robot controller 14 through the external device interface 50.

Figure 4:
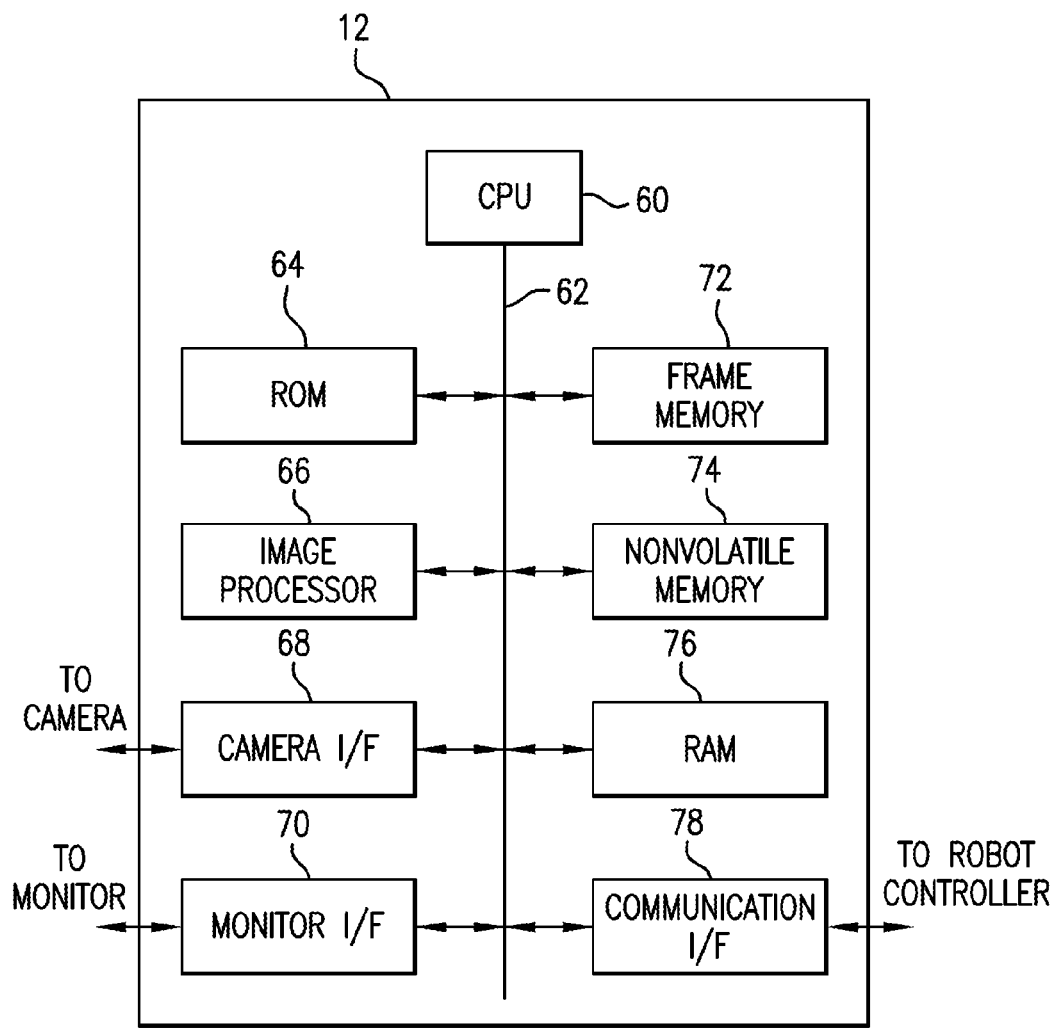
FIG. 4 is a schematic depiction of the components of the image processing unit depicted in FIG. 4.

FIG. 4 schematically depicts the image processing unit 12, which is connected to the robot controller 14 through the image processing unit interface 48 (FIG. 3). A processor 60 connects through a bus 62 to a ROM 64 for storing a system program executed by the processor 60, an image processor 66, a camera interface 68, a monitor interface 70, a frame memory 72, a non-volatile memory 74, a RAM 76 used for temporal data storage, and a robot controller interface 78. The camera interface 68 allows the camera 16 (FIG. 2) to connect with the image processing unit 12. The monitor interface 70 allows the image processing unit 12 to connect with the monitor 28 (FIG. 2). The robot controller interface 78 allows the image processing unit 12 to connect with the robot controller 14.

With reference back to FIG. 2, an object O is fixed in place and the camera 16, which is fixed to the robot arm 18, picks up images of the object O from a plurality of different directions. A teaching model of the object O is generated based on image data produced by picking up images of the object O using the camera 16. For example, six teaching model images can be generated by capturing six images of the object O from six different sides of the object O, e.g., top, left, front, rear, right, and bottom, as shown in FIGS. 5A-5F. Each teaching model image is stored in the image processing unit 12, for example in the RAM 76, and each teaching model image is associated with a respective camera position (x, y, z, Rx, Ry, Rz) of the camera 16 when the particular teaching model image was picked up. For example, the camera position can be set to zero, which is an arbitrary point in space occupied by the camera 16 at which all coordinates (x, y, z, Rx, Ry and Rz) measure zero (0,0,0,0, 0,0), when the camera 16 picks up the teaching model image shown in FIG. 5A, which is an image of the top of the object O. The robot 10 can then move the camera 16 to another location to pick up the teaching model image shown in FIG. 5B, for example by rotating the camera 16 about the x-axis and moving the camera 16 in the y-z plane on the camera coordinate system 24 to pick up an image of one of the sides, i.e., the left side, of the object O. The location of the camera 16 when picking up the teaching model teaching model image shown in FIG. 5B could be, for example, (0,15,20, 90,0,0). The process can be repeated so that the robot 10 moves the camera 16 to other locations to pick up the teaching model images shown in FIGS. 5C-5F and the coordinates on the camera coordinate system 24 for the camera 16 when picking up each image can be stored in the image processing unit 12.

Figure 5A:
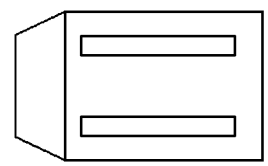
FIGS. 5A-5F depict teaching model images for use with the method and systems described herein.
Figure 5B:
Figure 5C:
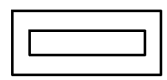
Figure 5D:
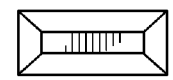
Figure 5E:
Figure 5F:
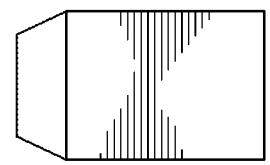

In addition to storing each teaching model image and the camera position of the camera 16 when the particular teaching model image was picked up, the relationship of the teaching model images with respect to one another can also be stored in the database. For example, that FIG. 5A is the teaching model image for the top of the object O and that FIG. 5B is the teaching model image for the left side of the object O (likewise for FIGS. 5C-5F) can also be stored in the image processing unit.

Processing of the teaching model images shown in FIG. 5 allows the image processing unit 12 to "learn" the object O. Visual recognition and guidance software, such as the commercially available CortexRecognition® visual recognition and guidance software available from Recognition Robotics, Inc., can be used to learn the object O and to locate the object O in x, y, z, and Rx, Ry and Rz.

Figure 6:
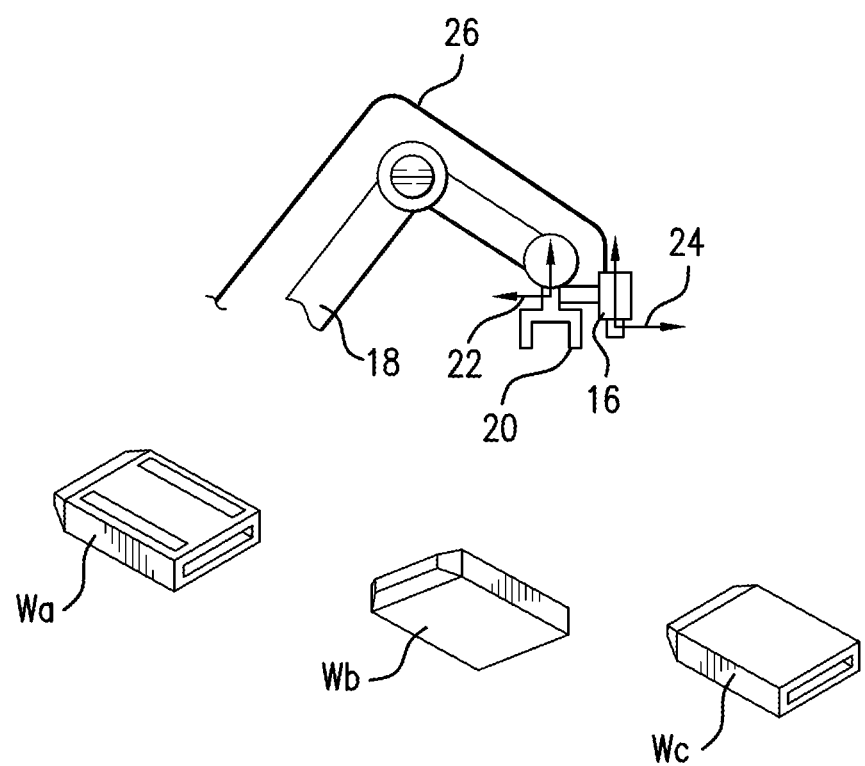
FIG. 6 depicts a distal portion of the robot arm of the robot shown in FIG. 2 and a plurality of workpieces.
Figure 7:
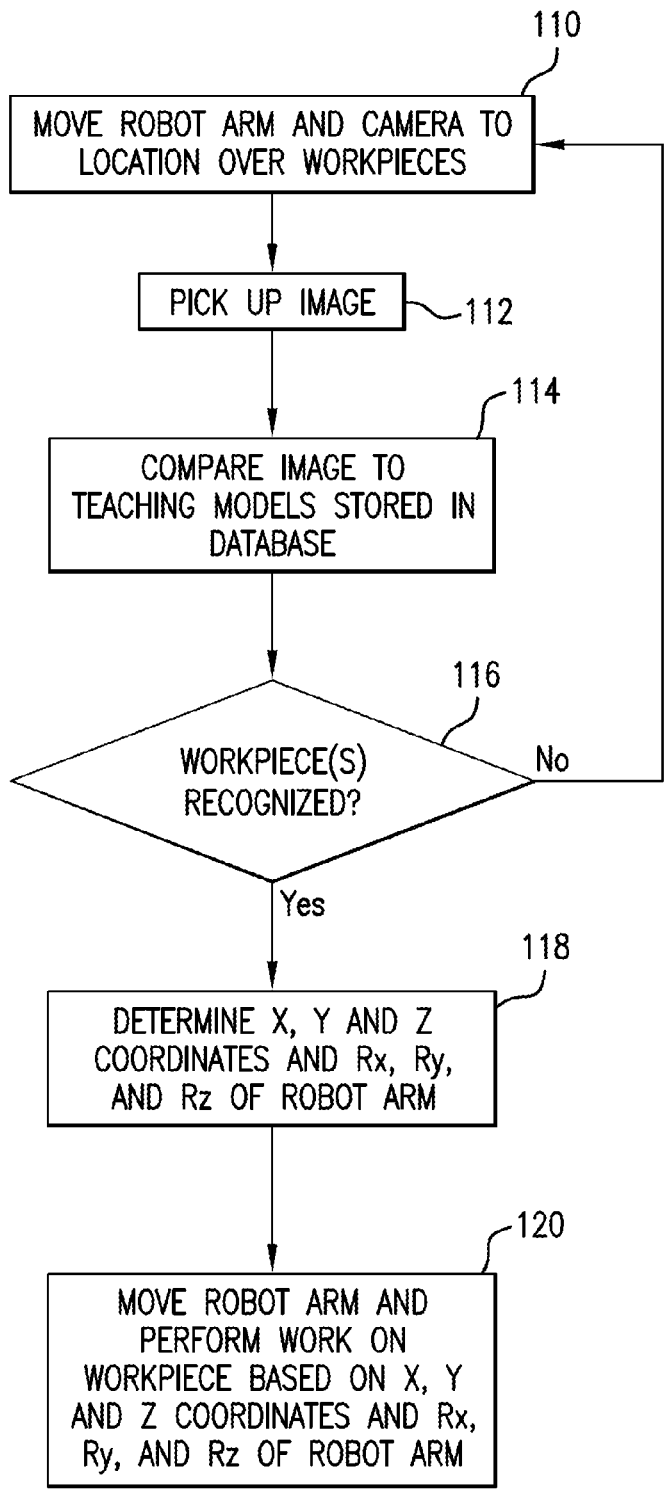
FIG. 7 is a flow diagram of a method for performing work, e.g., gripping, a workpiece.

After the object O has been learned by the image processing unit 12, the robot 10 can be used to perform operations on workpieces that are each similar in shape and size. FIG. 6 depicts a plurality of workpieces Wa, Wb, Wc that are each similar in shape and size to the object O in FIG. 2, but the workpieces are positioned at different orientations with respect to the camera 16 as compared to the teaching model images shown in FIGS. 5A-5F. FIG. 7 depicts a flow diagram to perform work on the plurality of workpieces, and will be described as a gripping operation. If an end effector other than the gripper 20 was connected with the robot arm 18, however, a different operation could be performed, e.g., brushing, cutting, drilling, gripping with a magnet, sanding, driving a screw, spraying, gripping with a vacuum cup, welding, etc.

At 110 in FIG. 7, the robot arm 18 and the camera 16 are moved to a location with respect to the workpieces Wa, Wb, Wc, which is typically hovering over the workpieces Wa, Wb, Wc, with each of the workpieces Wa, Wb, Wc within the field of view (FOV) of the camera 16. At 112, an initial image of the FOV is picked up with the camera 16 and sent to the image processing unit 12. At 114, the image processing unit 12 compares the initial image to teaching models, which can be the teaching model images (FIGS. 5A-5F) or data extracted from the teaching model images, stored in the image processing unit 12. At 116, the image processing unit 12 determines whether any workpieces are recognized, for example by determining whether there is an adequate match to one teaching model in the initial image.

When picking up the image, at 112, with the camera 16 at the position shown in FIG. 6, the workpiece Wa would have the top and right side of the workpiece Wa within the FOV, the workpiece Wb would have the rear and top of the workpiece Wb in the FOV, and the workpiece Wc would have the bottom and rear of the workpiece Wc in the FOV. As apparent, the presentation of each workpiece Wa, Wb, Wc with respect to the camera 16 is be different than the presentation of the object O in the teaching model images shown in FIGS. 5A-5F. Using the aforementioned visual recognition and guidance software, for example, the image processing unit 12 can recognize the workpiece 5A to determine whether an adequate match exists between the image of the workpiece Wa within the initial image and the teaching model image shown in FIG. 5A.

If the image processing unit 12 does not recognize any workpieces, at 116, then the process reverts to step 110 and moves the robot arm 18 and the camera 16 to another location over the workpieces Wa, Wb, Wc. The camera 16 picks up another image, at 112, which can also be referred to as an initial image, the image processing unit 12 compares the initial image to the teaching model images (FIGS. 5A-5F) stored in the image processing unit 12, at 114, and step 116 is repeated so that the image processing unit 12 determines whether an adequate match to one teaching model exists in the subsequent image.

If the image processing unit 12 recognizes at least one of the workpieces Wa, Wb, Wc, then, at 118, the initial image is processed to determine x, y, and z and Rx, Ry and Rz of the gripper 20 (or other end effector) with respect to each recognized workpiece. The program running on the image processing unit 12, such as the aforementioned CortexRecognition® visual recognition and guidance software, is able to determine x, y, and z and Rx, Ry and Rz of the of the camera 16 with respect to an individual workpiece, such as the workpiece Wa in FIG. 6. Since the offset between the camera coordinate system 24 and the robot coordinate system 22 is known, the x, y, and z and Rx, Ry and Rz of the gripper 20 with respect to the individual workpiece Wa can be determined.

With the position of the camera 16 with respect to the one workpiece, e.g. workpiece Wa in FIG. 6, now known, the robot arm 18 can be moved using the robot controller 14 to perform work on the workpiece Wa, at 120. For example, the robot arm 18 can be moved to grip the workpiece Wa using the gripper 20. As mentioned above, other types of work can also be performed on the workpiece Wa if a different end effector other than the gripper 20 is connected to the robot arm 18.

The relationship of the teaching model images with respect to one another is also stored in the image processing unit. 12. This can also facilitate performing work on the workpiece Wa with less recognition. For example, if workpiece Wa is located in the initial image from step 112 based on a match with FIG. 5E, which is the right side of the object O, then the top of the workpiece Wa can be located based on the relationship between FIG. 5A and FIG. 5E. The relationship between FIG. 5A and FIG. 5E can be stored in a manner that the image processing unit 12 knows that the side of the object O represented by FIG. 5A is rotationally offset 90 degrees about the x axis in the y-z plane from the side of the object O represented by FIG. 5E. This information can be used to deliver instructions to the robot arm 18 through the robot controller 14 to guide the gripper 20 to the top of the workpiece Wa.

Figure 8:
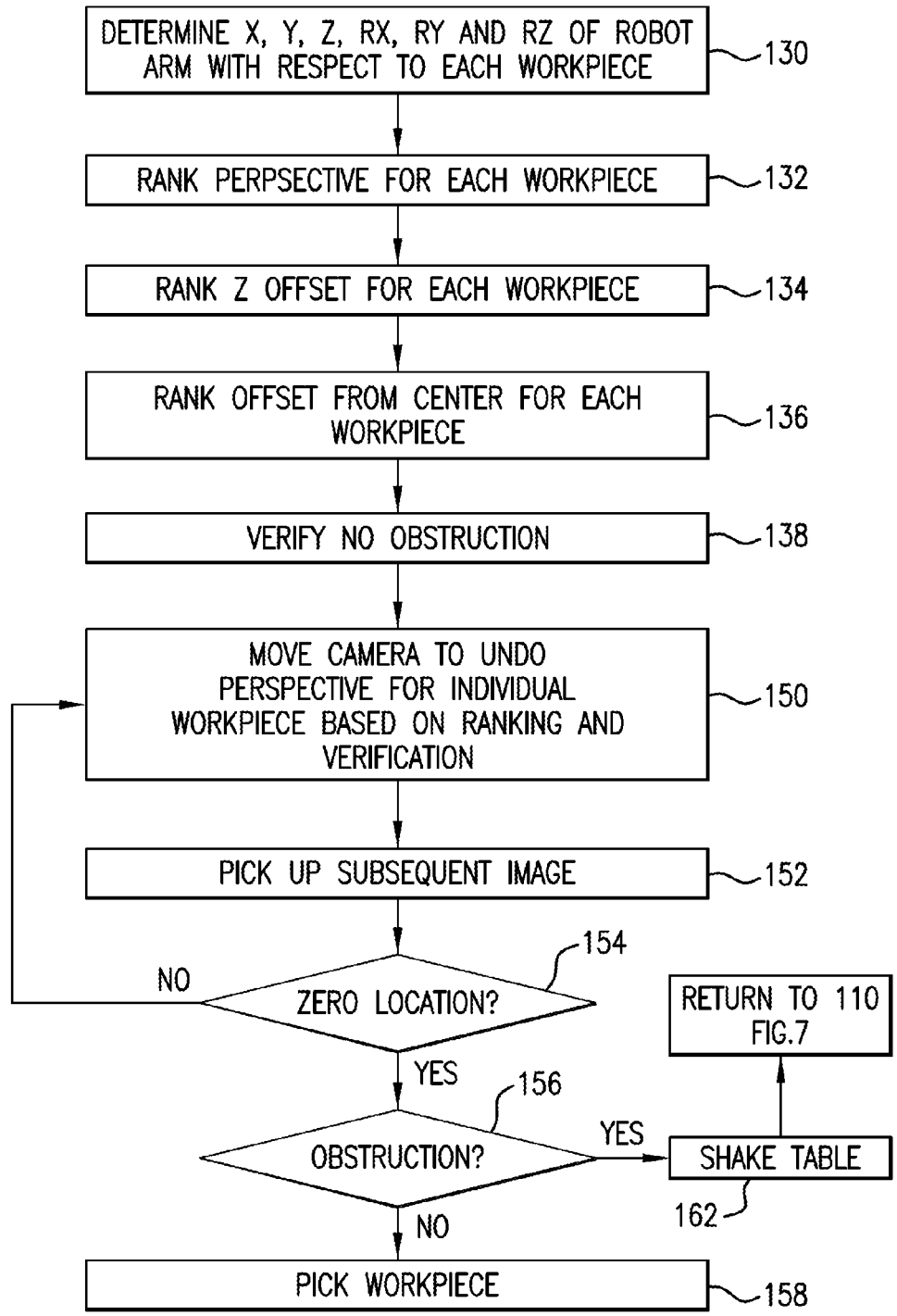
FIG. 8 is a flow diagram of additional steps of the method for performing work, e.g., gripping, a workpiece

FIG. 8 depicts additional steps that can be performed after the workpieces Wa, Wb, Wc have been recognized, at step 116 in FIG. 7. At 130, x, y, and z and Rx, Ry, and Rz of the gripper 20 (or other end effector or location on the robot arm 18) with respect to each workpiece Wa, Wb, Wc can be determined. As explained above, the presentation of each workpiece Wa, Wb, Wc with respect to the camera 16 is different than the presentation of the object O in the teaching model images shown in FIGS. 5A-5F. As such, the perspective of each workpiece in the initial image, which was picked up at 112 in FIG. 7, is different. At 132, a processor in communication with the camera 16 and the robot 10, such as a processor in the image processing unit 12 or in the robot controller 14, ranks each workpiece Wa, Wb, Wc in order of its perspective in the initial image. The perspective of each workpiece in the initial image can be determined using the aforementioned CortexRecognition® visual recognition and guidance software, for example.

At 134, the processor in communication with the camera 16 and the robot 10, such as the processor in the image processing unit 12 or in the robot controller 14, ranks each workpiece Wa, Wb, Wc in the initial image in order of its offset in z from the camera 16. The offset in z of each workpiece in the initial image can also be determined using the aforementioned CortexRecognition® visual recognition and guidance software, for example.

At 136, the processor in communication with the camera 16 and the robot 10, such as the processor in the image processing unit 12 or in the robot controller 14, ranks each workpiece Wa, Wb, Wc in the initial image in order of its offset from a center of the initial image. The offset from center of each workpiece in the initial image can also be determined using the aforementioned CortexRecognition® visual recognition and guidance software, for example.

At 138, the processor in communication with the camera 16 and the robot 10, such as the processor in the image processing unit 12 or in the robot controller 14, verifies whether there is an obstruction over any of the workpieces Wa, Wb, Wc. For example, in a gripping operation, each of the workpieces Wa, Wb, Wc would have a work (gripping) location where the workpiece is to be grasped by the gripper 20. This work location can be taught to the image processing unit 12, for example using the aforementioned CortexRecognition® visual recognition and guidance software. The processor can then determine whether gripping location is obstructed, for example by another workpiece. If the work (gripping) location is not recognized in the initial image, then the processor determines that the work (gripping) location is obstructed.

At 150, the robot 10 moves the camera 16 to undo the perspective for an individual workpiece, e.g., the workpiece Wa, based on the aforementioned rankings and after verifying that the gripping location workpiece Wa is not obstructed. For example, after determining the perspective for each recognized workpiece Wa, Wb, Wc with respect to the camera 16 in the initial image, the camera 16 is moved with the robot arm 18 to a reduced perspective location with respect to one recognized workpiece, e.g., workpiece Wa, among the plurality of recognized workpieces. The reduced perspective location is where the camera 16 is located with respect to the workpiece Wa such that a subsequent image to be picked up by the camera 16 is expected to have a reduced perspective as compared to the initial image. Ideally, the camera 16 is moved to a zero location with respect to the workpiece Wa. The zero location is where the camera 16 was located with respect to the object O, which was used to generate the teaching model, when one teaching model image was picked up by the camera 16. Since the x, y and z and Rx, Ry and Rz for the camera 16 with respect to each recognized workpiece Wa, Wb, Wc can be determined in a world coordinate system, the robot arm 18 can be moved to a new location, e.g., the reduced perspective location, by the robot controller 14.

Determining which workpiece Wa, Wb, Wc among the recognized workpieces to move to and undo the perspective of first can based on (1) choosing the workpiece Wa, Wb, Wc that has the least perspective based on the rankings in step 132, (2) choosing the workpiece Wa, Wb, Wc that is closet in z to the camera 16 based on the rankings in step 134, (3) choosing the workpiece Wa, Wb, Wc that is closest to the center of the initial image based on the rankings in step 136, or (4) choosing the workpiece Wa, Wb, Wc that has no obstruction of a work (gripping) location, which was determined at step 138. Moreover, the rankings can be weighted; for example, workpieces that are closer in z to the camera 16 can be chosen before workpieces that are located further in z from the camera 16.

After the camera 16 has been moved to undo the perspective for an individual workpiece, at 150, a subsequent image is picked up by the camera 16 at 152. Using the program running on the processor, a determination can be made whether the camera 16 (or the gripper 20) is located at the zero location, at 154. If the camera 16 (or the gripper 20) is not located at the zero location, then the process can loop back to 150 to undo the perspective again. If the camera 16 (or the gripper 20) is located at the zero location, then the processor can confirm that the work (gripping) location for the workpiece Wa is not obstructed at 156. If the work (gripping) location for the workpiece Wa is not obstructed, then at 158, the robot arm 18 can move the gripper 20 to grip the workpiece Wa. If, however, the work (gripping) location for the workpiece Wa is obstructed, then at 162, the robot arm 18 can be used to shake the table or other structure supporting the workpieces. If the table is shaken at 162, then the process returns to 110 in FIG. 7.

By using the aforementioned visual recognition and guidance software to determine a matching teaching model image, fewer teaching models are necessary and processing times are reduced as compared to other automated guidance systems. Also, the image processing unit 12 is configured to determine x, y and z and Rx, Ry and Rz of the gripper 20 (or other end effector) with respect to the workpiece Wa can be based solely on a comparison between the initial image and data from the teaching models derived from teaching model images taken by the camera 16. An additional 3D sensor is not required to determine the offset (measure in the z axis) of the end effector with respect to the workpiece Wa. The processes described herein have been described with reference to a gripping operation, however, other operations, which were mentioned above, could also be performed using the automated guidance system and method described herein. Also, other types of visual recognition and guidance software capable of determining x, y, and z and Rz, Ry and Rz of a camera 16 with respect to an object could also be employed.

It will be appreciated that various of the above-disclosed and other features and functions, or alternatives or varieties thereof, may be desirably combined into many other different systems or applications. Also that various presently unforeseen or unanticipated alternatives, modifications, variations or improvements therein may be subsequently made by those skilled in the art which are also intended to be encompassed by the following claims.

The invention claimed is:

1. An automated guidance method comprising:
   picking up an initial image of a plurality of similarly shaped workpieces with a camera mounted to a movable component of a coordinated movement machine;
   visually recognizing individual workpieces among the plurality of similarly shaped workpieces using a program running on a processor in communication with the camera and the coordinated movement machine, wherein the program compares the initial image with a teaching model stored in a database, wherein the teaching model is based on teaching model images previously picked up by the camera and the teaching model images are of an object similar in shape and size to one of the plurality of similarly shaped workpieces;
   determining x, y and z and Rx, Ry and Rz of the movable component with respect to each recognized workpiece among the plurality of recognized workpieces based solely on a comparison between the initial image and data from the teaching models derived from teaching model images taken by the camera without the use of a three-dimensional sensor to determine z, which is an offset of the movable component with respect to the recognized workpiece; and
   moving the movable component of the coordinated movement machine after determining x, y and z and Rx, Ry and Rz of the movable component.

2. The automated guidance method of claim 1, further includes:
   ranking each recognized workpiece based on a perspective with respect to the camera for each recognized workpiece.

3. The automated guidance method of claim 1, further includes:
   ranking each recognized workpiece based on an offset in z between the camera and each recognized work piece.

4. The automated guidance method of claim 1, further includes:
   ranking each recognized workpiece based on an offset from a center of the initial image.

5. The automated guidance method of claim 1, further includes:
   ranking each recognized workpiece based on a perspective with respect to the camera for each recognized workpiece;
   ranking each recognized workpiece based on an offset in z between the camera and each recognized work piece; and
   ranking each recognized workpiece based on an offset from a center of the initial image,
   wherein moving the movable component of the coordinated movement machine further includes moving the movable component to perform work on at least one recognized workpiece or to pick up a subsequent image of the at least one recognized based on at least one ranking.

6. The automated guidance method of claim 5, further includes:
   picking up the subsequent image with the camera after moving the movable component; and
   determining whether a work location on the at least one recognized workpiece is visible in the subsequent image.

7. The automated guidance method of claim 5, wherein moving the movable component of the coordinated movement machine further includes moving the movable component based on each ranking.

8. The automated guidance method of claim 5, wherein moving the movable component of the coordinated movement machine further includes moving the movable component to a zero location with respect to the at least one recognized workpiece, wherein the zero location is where the camera was located with respect to the object, which was used to generate the teaching model, when one teaching model image was picked up by the camera.

9. The automated guidance method of claim 1, further comprising:
   determining a perspective for each recognized workpiece with respect to the camera in the initial image; and
   after determining the perspective for each recognized workpiece with respect to the camera in the initial image, moving the camera with the coordinated movement machine to a reduced perspective location with respect to one recognized workpiece among the plurality of recognized workpieces, wherein the reduced perspective location is where the camera is located with respect to the one recognized workpiece such that a subsequent image to be picked up by the camera is expected to have a reduced perspective as compared to the initial image.

10. The automated guidance method of claim 9, further comprising:
    picking up a subsequent image of the one recognized workpiece with the camera in the reduced perspective location; and
    determining x, y and z and Rx, Ry and Rz of the movable component with respect to the one recognized workpiece; and
    moving the movable component to perform work on the one recognized workpiece after determining x, y and z and Rx, Ry and Rz of the movable component with respect to the one recognized workpiece.

11. The automated guidance method of claim 10, further comprising:
    determining whether a work location on the one recognized workpiece is visible in the subsequent image prior to moving the movable component to perform work on the one recognized workpiece.

12. The automated guidance method of claim 1, wherein the teaching model images include images of each of the top, left, front, rear, right, and bottom views of the object.

13. The automated guidance method of claim 12, wherein the relationship of the teaching model images with respect to one another is stored in the database.

14. An automated guidance system for a coordinated movement machine, the system comprising:
    a camera mounted to a movable component of the coordinated movement machine; and
    at least one processor in communication with the camera and the coordinated movement machine, the at least one processor being configured to visually recognize individual workpieces among a plurality of similarly shaped workpieces using a program running on the at least processor, wherein the program compares an initial image, which is picked up by the camera, with a teaching model stored in a database, wherein the teaching model is based on teaching model images previously picked up by the camera and the teaching model images are of an object similar in shape and size to one of the plurality of similarly shaped workpieces;
    the at least one processor being further configured to determine x, y and z and Rx, Ry and Rz of the movable component with respect to each recognized workpiece among the plurality of recognized workpieces based solely on a comparison between the initial image and data from the teaching models derived from teaching model images taken by the camera without the use of a three-dimensional sensor to determine z, which is an offset of the movable component with respect to the recognized workpiece, and to move the movable component of the coordinated movement machine after determining x, y and z and Rx, Ry and Rz of the movable component.

15. An automated guidance method comprising:
    picking up an initial image of a plurality of similarly shaped workpieces with a camera mounted to a movable component of a coordinated movement machine;
    visually recognizing individual workpieces among the plurality of similarly shaped workpieces using a program running on a processor in communication with the camera and the coordinated movement machine, wherein the program compares the initial image with a teaching model stored in a database, wherein the teaching model is based on teaching model images previously picked up by the camera and the teaching model images are of an object similar in shape and size to one of the plurality of similarly shaped workpieces;
    determining x, y and z and Rx, Ry and Rz of the movable component with respect to each recognized workpiece among the plurality of recognized workpieces;
    ranking each recognized workpiece based on a perspective with respect to the camera for each recognized workpiece;
    ranking each recognized workpiece based on an offset in z between the camera and each recognized work piece; and
    ranking each recognized workpiece based on an offset from a center of the initial image; and
    moving the movable component to a zero location with respect to the at least one recognized workpiece, wherein the zero location is where the camera was located with respect to the object, which was used to generate the teaching model, when one teaching model image was picked up by the camera.

* * * * *